US010295814B2

(12) United States Patent
Siebenmorgen et al.

(10) Patent No.: US 10,295,814 B2
(45) Date of Patent: May 21, 2019

(54) LIGHT SHEET MICROSCOPE AND METHOD FOR OPERATING SAME

(71) Applicant: Carl Zeiss Microscopy GmbH, Jena (DE)

(72) Inventors: Jörg Siebenmorgen, Jena (DE); Helmut Lippert, Jena (DE); Thomas Kalkbrenner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/463,120

(22) Filed: Mar. 20, 2017

(65) Prior Publication Data

US 2017/0269345 A1  Sep. 21, 2017

(30) Foreign Application Priority Data

Mar. 21, 2016 (DE) .................. 10 2016 204 653

(51) Int. Cl.
*G02B 21/14* (2006.01)
*G02B 21/36* (2006.01)
(Continued)

(52) U.S. Cl.
CPC .......... *G02B 21/14* (2013.01); *G02B 5/0221* (2013.01); *G02B 21/006* (2013.01);
(Continued)

(58) Field of Classification Search
CPC .. G02B 21/14; G02B 5/0221; G02B 21/0032; G02B 21/0036; G02B 21/006;
(Continued)

(56) References Cited

U.S. PATENT DOCUMENTS 9,804,378 B2 * 10/2017 Singer .................. G02B 21/08
2012/0206798 A1 * 8/2012 Knop .................. G02B 21/002
359/385

(Continued)

FOREIGN PATENT DOCUMENTS

DE  10 2012 110 077    6/2014
DE  10 2013 107 297    1/2015
(Continued)

OTHER PUBLICATIONS

Mehta, S. et al. "*Quantitative phase-gradient imaging at high resolution with asymmetric illumination-based differential phase contrast*", 2009, Optics Letters 34: 1924-1926).

(Continued)

*Primary Examiner* — Frank G Font
(74) *Attorney, Agent, or Firm* — Haug Partners LLP

(57) ABSTRACT

A microscope including an illumination objective with a first optical axis, embodied to produce a light sheet, and a detection objective with a second optical axis, embodied to detect light coming from the specimen plane. The illumination objective and the detection objective are aligned relative to one another and the specimen plane so that the first and second optical axes intersect in the specimen plane and include a substantially right angle therebetween. The optical axes each include an angle which differs from zero with a reference axis directed orthogonal to the specimen plane. An overview illumination apparatus for wide-field illumination of the specimen plane, includes an illumination optical unit with a third optical axis. The characterizing feature is that the detection objective is provided to detect both light from the light sheet and light from the illumination optical unit. A method is also provided for operating a light sheet microscope.

17 Claims, 8 Drawing Sheets

(51) Int. Cl.
*G02B 5/02* (2006.01)
*G02B 21/10* (2006.01)
*G02B 21/06* (2006.01)
*G02B 21/00* (2006.01)
*G02B 21/02* (2006.01)

(52) U.S. Cl.
CPC ....... *G02B 21/008* (2013.01); *G02B 21/0032* (2013.01); *G02B 21/0036* (2013.01); *G02B 21/0092* (2013.01); *G02B 21/02* (2013.01); *G02B 21/06* (2013.01); *G02B 21/10* (2013.01); *G02B 21/367* (2013.01)

(58) Field of Classification Search
CPC .. G02B 21/008; G02B 21/0092; G02B 21/02; G02B 21/06; G02B 21/10; G02B 21/367
USPC .................................................. 359/370, 371
See application file for complete search history.

(56) References Cited

U.S. PATENT DOCUMENTS

| | | | |
|---|---|---|---|
| 2014/0126046 A1 | 5/2014 | Shroff et al. | |
| 2015/0022881 A1* | 1/2015 | Loza Alvarez | G02B 21/06 359/385 |
| 2015/0098126 A1* | 4/2015 | Keller | G02B 21/0076 359/385 |
| 2015/0226670 A1* | 8/2015 | Kleppe | G02B 21/06 359/385 |
| 2016/0139394 A1* | 5/2016 | Taniguchi | G02B 21/24 359/385 |
| 2016/0154236 A1* | 6/2016 | Siebenmorgen | G02B 21/0032 359/385 |
| 2016/0291303 A1* | 10/2016 | Degen | G02B 27/0025 |
| 2016/0291304 A1* | 10/2016 | Singer | G02B 27/0025 |
| 2016/0301915 A1* | 10/2016 | Shechtman | G02B 21/0064 |
| 2016/0305883 A1* | 10/2016 | Betzig | G02B 21/16 |
| 2016/0327779 A1* | 11/2016 | Hillman | G02B 21/367 |

FOREIGN PATENT DOCUMENTS

| | | |
|---|---|---|
| DE | 10 2013 112 596 | 5/2015 |
| EP | 2 983 029 | 2/2016 |
| WO | WO 2012/110488 | 8/2012 |

OTHER PUBLICATIONS

European Search Report for Application No. 17 16 1551.1 dated Sep. 9, 2017.
German Search Report for Application No. 10 2016 204 653.5 dated Oct. 27, 2016.

* cited by examiner

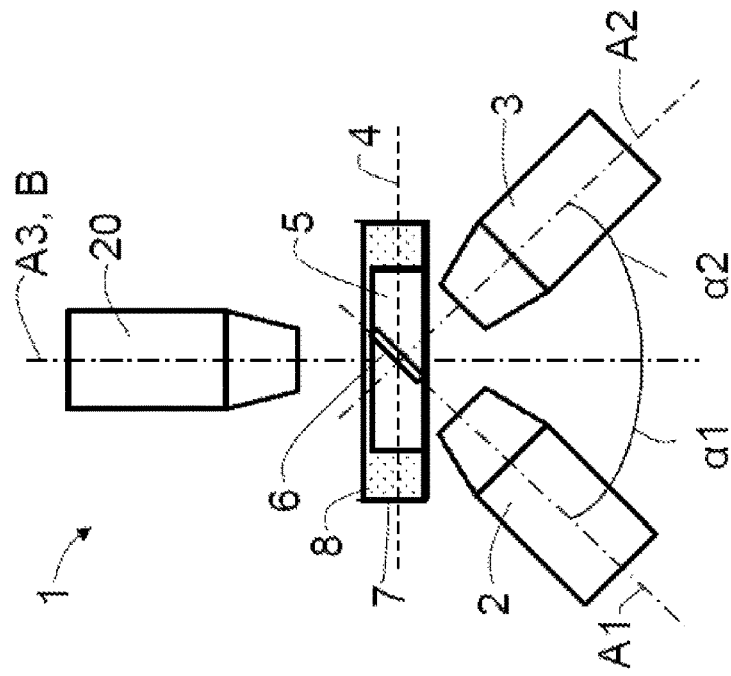
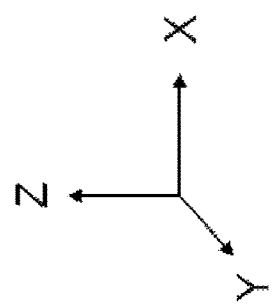
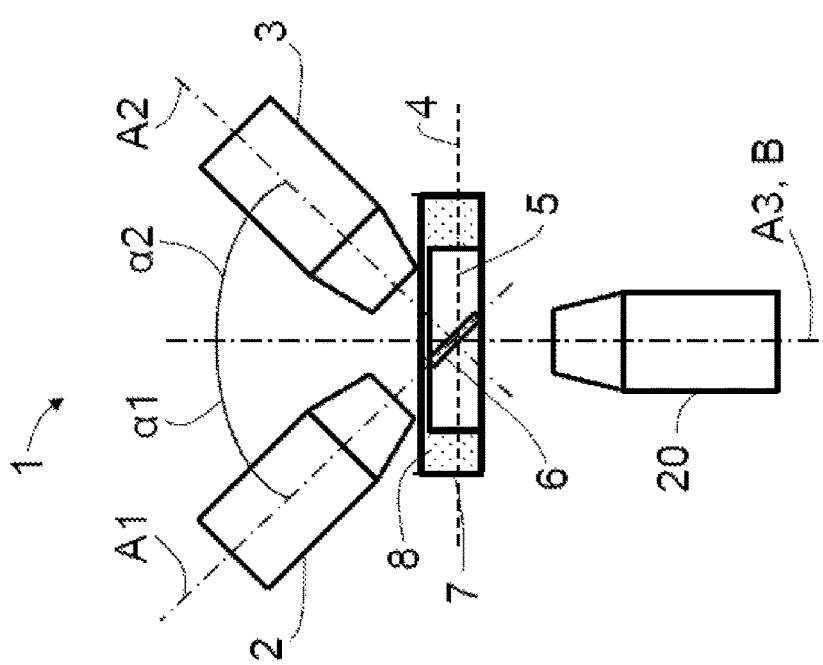
Fig. 1a
Prior art
Fig. 1b
Prior art

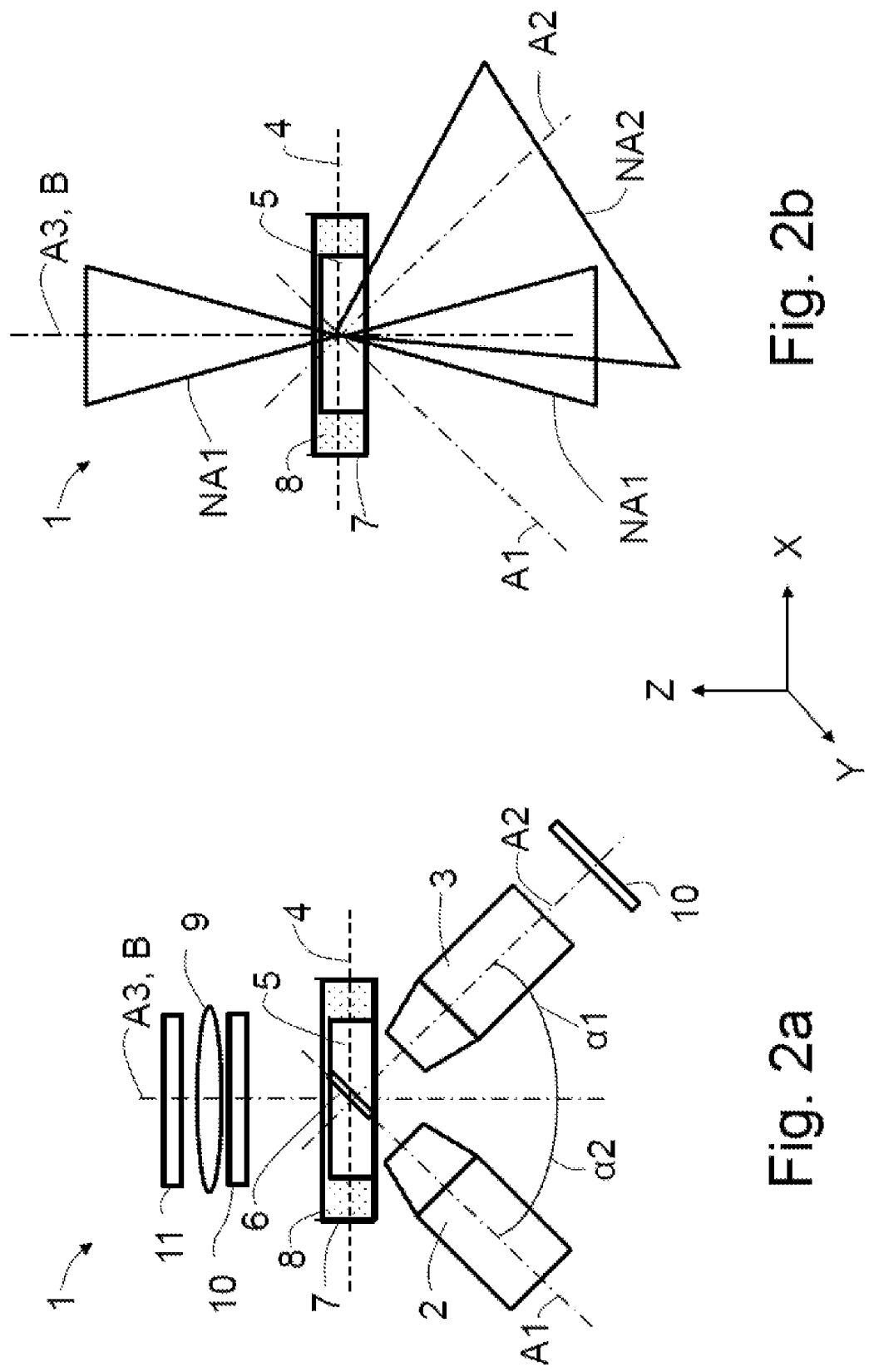

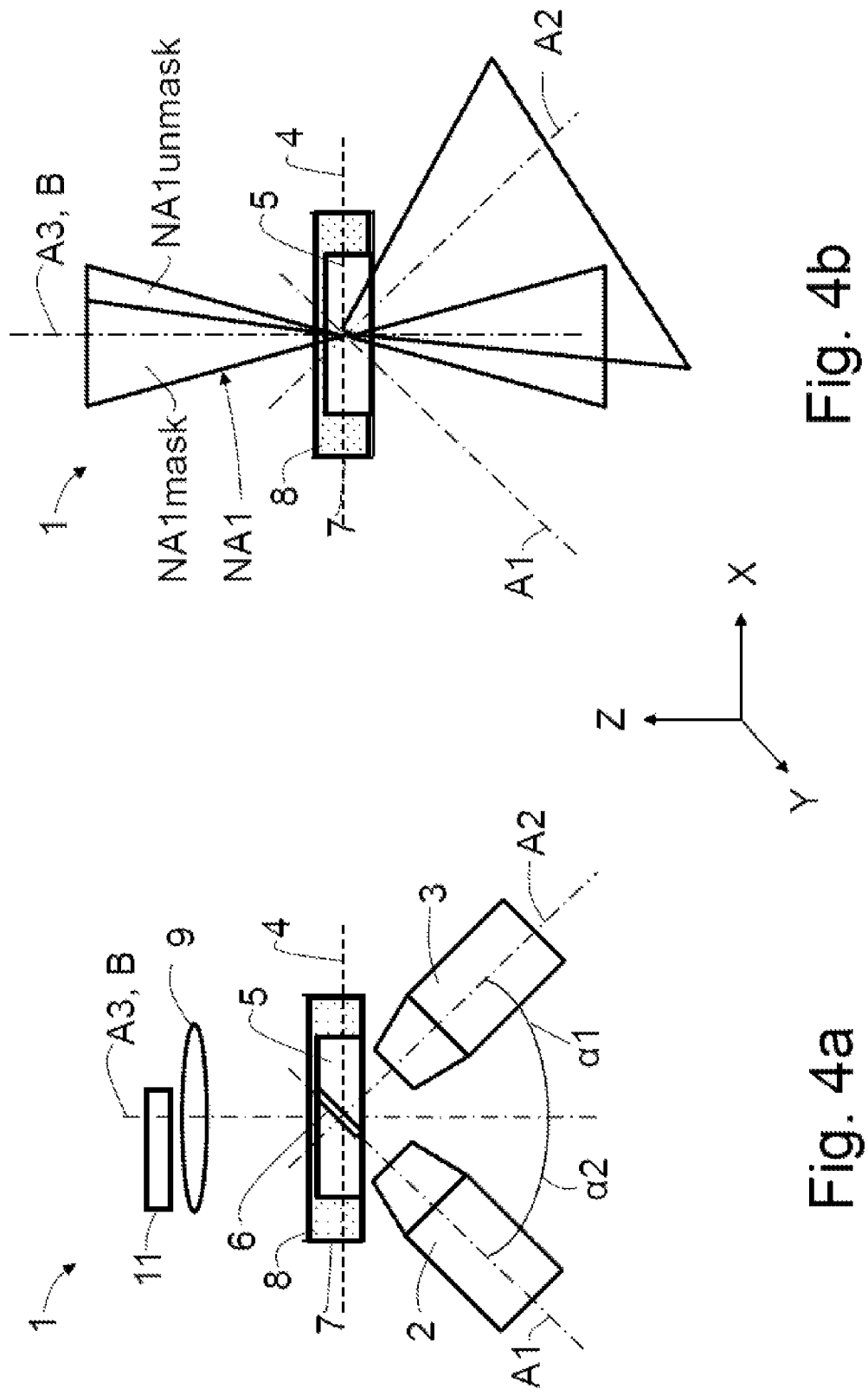

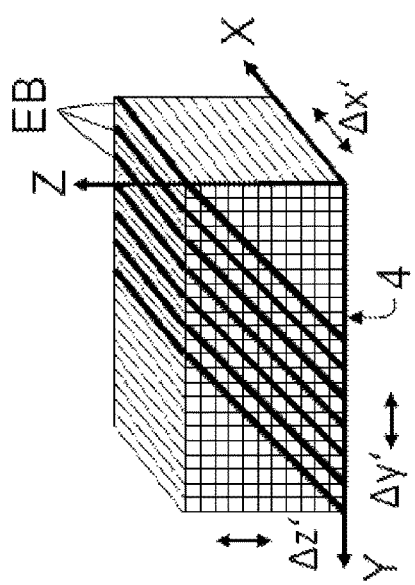
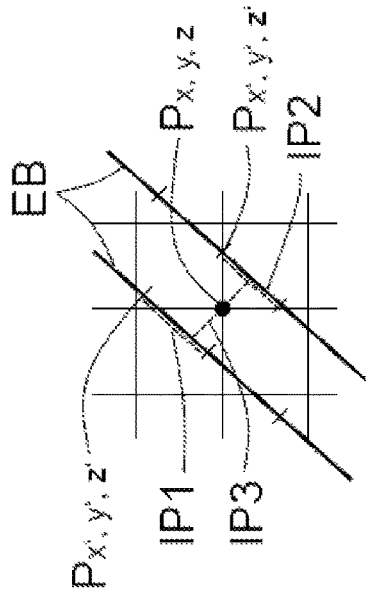
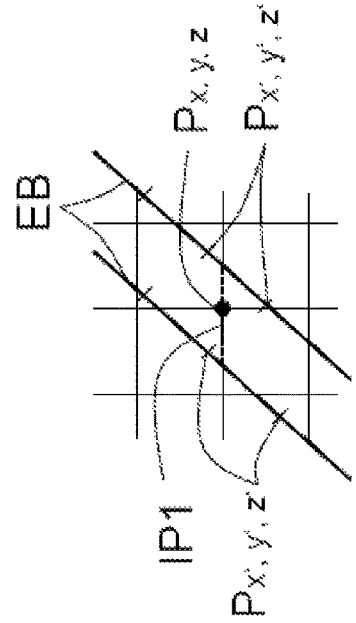
Fig. 8a
Fig. 8b
Fig. 8c

LIGHT SHEET MICROSCOPE AND METHOD FOR OPERATING SAME

The present application claims priority from German Patent Application No. 10 2016 204 653.5 filed on Mar. 21, 2016, the disclosure of which is incorporated herein by reference in its entirety.

FIELD OF THE INVENTION

It is noted that citation or identification of any document in this application is not an admission that such document is available as prior art to the present invention.

The invention relates to a light sheet microscope and a method for operating a light sheet microscope One of the main applications of light sheet microscopy lies in imaging midsized specimens, for example organisms, with dimensions of several 100 μm up to a few millimeters. As a rule, these specimens are embedded in agarose and arranged in a glass capillary. For the purposes of examining the specimen, the glass capillary is introduced into a water-filled specimen chamber and the agarose with the specimen is pressed a little out of the capillary. The specimen is illuminated by a light sheet and the fluorescence emanating from the specimen is imaged on a camera by means of a detection objective which is perpendicular to the light sheet and hence also perpendicular to the light sheet optical unit.

In accordance with the prior art, a layout of a microscope 1 for light sheet microscopy (SPIM layout; single plane illumination microscopy) comprises an illumination objective 2 and a detection objective 3 (also referred to as SPIM objectives below) which are directed onto the specimen plane 4 from above at an angle of 45° in relation to the specimen plane 4 and at right angles in relation to one another (see FIG. 1a). A specimen 5 arranged in the specimen plane 4 is situated, for example, on the base of a specimen holder 7 embodied as a petri dish. The specimen holder 7 is filled with a liquid 8, for example water, and the two SPIM objectives 2, 3 are immersed in the liquid 8 during the application of the light sheet microscopy. The specimen plane 4 extends in a plane XY spanned by the X-axis X and the Y-axis Y of a Cartesian coordinate system. The first optical axis A1 and the second optical axis A2 extend in a plane XZ spanned by the X-axis X and the Z-axis Z of the Cartesian coordinate system.

This approach offers the advantage of a high resolution in the axial direction since a thin light sheet 6 may be produced by means of the illumination objective 2. Smaller specimens 5 may be examined on account of the higher resolution. Additionally, the bothersome background fluorescence is significantly reduced and the signal-to-noise ratio is improved as a result thereof.

In accordance with the prior art, an overview image parallel to the specimen plane 4 and to the specimen holder 7 is produced by virtue of a wide-field image being recorded perpendicular through the transparent base of the specimen holder 7 by means of a wide-field objective 20 situated below the specimen 5. Transmitted light illumination of the specimen 5 and capturing the transmitted light is not possible here as the two SPIM objectives 2, 3 are arranged too tightly next to one another.

In order to facilitate simpler specimen preparation in standard specimen containers such as e.g. multiwell plates, it is possible to maintain the 45° configuration but have the two SPIM objectives 2, 3, in an inverse arrangement, be directed into the specimen plane 4 from below through the transparent base of the specimen holder 7 (FIG. 1b). In this arrangement, it is necessary to correct the aberrations caused by the specimen holder 7 which is inclined relative to the optical axes A1 and A2 and present in the form of a cover slip by using special optical elements (DE 10 2013 107 297 A1, DE 10 2013 112 596 A1). The specimen 5 arranged in the specimen plane 4 is illuminated through the base of the specimen holder 7 and excited fluorescence of the specimen is detected. It is possible to use specimen holders 7 such as e.g. multiwell plates, Petri dishes and/or object supports and contamination of the specimens, in particular in the case of high-throughput screening, may be avoided.

A problem existing in the case of the upright and inverse configurations is that a region of interest must be imaged as an overview image through the specimen by means of the wide-field objective. As a rule, for the upright arrangement, this means that the wide-field objective must look through several millimeters of liquid, e.g. an aqueous solution such as a buffer. By way of example, if use is made of multiwell plates, a significant meniscus forms in the individual depressions thereof at the liquid surface, said meniscus exerting a lens effect such that this imaging may only occur—if at all—with a very small NA. Further solutions provide for displacing, twisting and/or tilting the illumination objective and/or the detection objective in order to be able to position the wide-field objective.

As a rule, contrast methods serve to visualize low-contrast objects (e.g. phase objects) in microscopy and are often complemented by fluorescence imaging. Using this, specimens, e.g. cells or tissue sections, are imaged in transmitted light in the totality thereof and their state is analyzed.

Recently, further options for enhancing the contrast on low-contrast (phase) objects were developed, which supply the same or similar information content as the "conventional" methods via a different route. Examples thereof include the half-pupil contrast, the oblique illumination and the TIE (transport of intensity equation).

WO 2012/110488 A2 has disclosed a microscope which comprises a beam path for illuminating a specimen and at least one detection beam path. The microscope comprises a focusing unit in the illumination beam path for focusing the illumination radiation. The focusing unit defines a substantially two-dimensional illumination region which extends in the direction of the illumination beam path and transversely thereto. Moreover, a bounding element is arranged in the illumination beam path, said bounding element being embodied to selectively illuminate sections of the illumination region. Further, WO 2012/110488 A2 discloses a microscopy method.

In the case of largely transparent specimens 5, all these contrast methods require transmitted light illumination, which cannot be readily integrated into microscope 1 with a 45° SPIM arrangement for reasons described above.

SUMMARY OF THE INVENTION

The invention is based on the object of proposing an option for light sheet microscopy, which facilitates the recording of an overview image parallel to the specimen plane, with the overview image having a high information content, in particular a high contrast.

The microscope comprises an illumination objective with a first optical axis, embodied to produce a light sheet, wherein the light sheet is produced or producible, at least in part, in a specimen plane, and a detection objective with a second optical axis, embodied to detect light coming from the specimen plane, wherein the illumination objective and the detection objective are aligned relative to one another and relative to the specimen plane in such a way that the first optical axis and the second optical axis intersect in the specimen plane and include a right angle therebetween, and the first optical axis and the second optical axis each include an angle which differs from zero with a reference axis directed orthogonal to the specimen plane. Moreover, there is an overview illumination apparatus embodied for wide-field illumination of the specimen plane, comprising an illumination optical unit with a third optical axis.

According to the invention, the detection objective is provided and embodied to detect both light from the light sheet and light from the overview illumination apparatus.

Below, the specimen plane serves as a reference plane.

The microscope may be embodied as an upright microscope. In further embodiments, it may be embodied as an inverted microscope.

Since the third optical axis of the illumination optical unit is aligned at an angle unequal to 0° in relation to the second optical axis of the detection objective, an oblique overview or wide-field illumination (abbreviated to illumination below) is necessarily brought about, without stops needing to be introduced into the beam path of the illumination optical unit, as is usual in conventional stands and arrangements.

The oblique illumination facilitates recording an overview image or wide-field image with a stronger contrast than in the case of an illumination carried out parallel to the optical axis of the detection objective. The illumination optical unit in accordance with the microscope according to the invention need not necessarily, but may, be immersed into a liquid of the specimen holder (so-called water dipping).

Rather, the specimen may be illuminated through the air/water interface using an (air) condenser. This is possible as the aberrations in the illumination, occurring in the process, are uncritical for imaging.

In an advantageous embodiment, the third optical axis coincides with the reference axis. Thus, illumination is carried out substantially perpendicular to the specimen plane.

In accordance with the geometry of the microscope, e.g. a condenser is arranged perpendicular to the specimen holder in such a way that the region of the specimen situated in the field of view of the detection objective is illuminated or illuminable.

The first optical axis and the second optical axis include a substantially right angle therebetween. Advantageously, deviations from a right angle are at most so great that an angle offset in the direction of the optical axis of the detection objective, occurring within the field of view, leads to deviations of the first optical axis and the second optical axis which are no more than one depth of field of the detection objective. Neither of the first optical axis and the second optical axis lies in the specimen plane.

The first or second optical axes include an angle with the reference axis which complement one another to substantially 90°.

A microscope according to the invention advantageously requires no additional wide-field objective for recording an overview image, as a result of which the microscope requires less space than a microscope according to the prior art, has a simpler layout and is producible in a more cost-effective manner.

It is provided that the light of the overview illumination apparatus is detected in the transmitted light.

In one possible embodiment of the microscope, the illumination optical unit is embodied as a condenser, an objective or as a lens.

In order to obtain a high contrast of the overview image, diffuse oblique illumination may be brought about in a possible embodiment of the microscope.

In further embodiments, the numerical apertures (NA) of the detection objective and the illumination optical unit are matched to one another in such a way that these overlap and an overlap region of the numerical apertures is present. By way of example, an overlap of the numerical apertures may be graphically ascertained and/or virtually depicted in two or three dimensions by virtue of the respective numerical apertures of the microscope being represented and/or simulated as being in their actual positions and alignments. The areas or spaces used together represent the overlap regions of the numerical apertures.

In order to effect contrasts in the overview image in accordance with the known principles of polarization contrast, differential interference contrast (DIC) or the Hoffmann contrast, in further embodiments of the microscope respectively one polarizer, additionally also at least one phase plate, Hoffmann optical units or DIC prisms in further embodiments, is/are respectively arranged in a beam path of the illumination optical unit and in a beam path of the detection objective.

Hoffmann optical units are optical elements, the arrangement and interaction of which allows an image of a specimen with a Hoffmann contrast to be obtained. For Hoffmann modulation contrast (HMC) microscopy, microscopes typically comprise a condenser with a slit diaphragm and a polarizer. The latter is arranged between the condenser and an illumination light source of the illumination optical unit.

A further embodiment of the microscope comprises a diffuser between the detection objective and the illumination optical unit. By way of example, a diffuser is formed by one or more static or dynamic diffusing screens.

An advantage of diffuse illumination is that there is no need for complicated optical units such as a Köhler illumination comprising an imaging optical unit, a condenser and stops. Diffuse illumination is carried out under many illumination angles and illumination directions. As a result, the effective numerical aperture of the illumination, which also influences the resolution of the imaging in the case of coherent or partly coherent imaging, may be increased by virtue of the diffusor being brought closer to the specimen plane and to the specimen.

Thus, the effective illumination NA may also be increased over the value specified nominally for the overview illumination optical unit, e.g. the illumination optical unit, using simple means.

Further, it is possible to set solid angle and direction of the illumination by virtue of e.g. only a ring or a ring segment of the diffuser being illuminated. This may easily be carried out by a corresponding mask arranged directly on the diffuser or by imaging a mask on to the diffuser, when the latter may be achieved by e.g. illuminating the diffuser by a conventional transmitted light condenser with a mask for phase contrast microscopy. Advantageously, the diffuse illumination may be combined with the oblique illumination already described above.

In one embodiment, the diffusor may be arranged directly in front of an illumination light source which, for example, is embodied as a light-emitting diode (LED) or OLED (organic LED), as an LED array or OLED array and/or as a halogen lamp. It is further possible that the diffusor is illuminated or illuminable by a present (Köhler) microscope illumination.

In further possible embodiments, the diffuse illumination is realized by means of a self-luminous diffuse illumination light source as diffusor, for example an LED and/or an OLED comprising a ground glass screen disposed downstream thereof.

In further possible embodiments, the microscope comprises a darkening element, for example a mask, in a beam path of the overview illumination apparatus, the overlap region of the numerical apertures being darkened by said darkening element such that dark-field illumination is produced or producible in the specimen plane.

In a further embodiment of the microscope, a mask is arranged in the pupil of the overview illumination apparatus or of the illumination optical unit as a darkening element.

The dark-field illumination may be effected by way of the illumination objective, which may be embodied as an SPIM illumination objective. It is also possible for a transmitted light illumination to be effected parallel to the reference axis, for example from above, wherein the overlap region of the numerical apertures is masked or maskable, for example by means of a mask, for example by means of a suitable stop.

In a further embodiment, the microscope comprises a movable mask in an illumination pupil of the overview illumination apparatus, said movable mask covering exactly one half of the illumination pupil, or rendering the latter coverable.

The method of the so-called half-pupil contrast (Mehta, S. et al. 2009, Optics Letters 34: 1924-1926) facilitates visual representations of phase objects in a relatively simple manner. To this end, a mask is introduced into the illumination pupil, with the mask half covering the illumination pupil. A transmitted light image is subsequently recorded. In the next step, the mask is introduced into the illumination pupil in such a way that the opposite half of the illumination pupil is covered. Once again, an image is recorded. If the masks are exactly in the pupil under Köhler illumination in the axial direction, this in each case results in a homogenously illuminated image of the specimen with half the intensity. However, a phase gradient in the specimen leads to lateral displacement of the image of the illumination pupil on the objective pupil which is proportional to the phase gradient. Subsequently, the two obtained partial images are subtracted from one another and normalized, as a result of which the phase gradients become representable.

The pupil division must be carried out precisely, i.e. the masks must cover exactly half of the pupil and must be situated exactly at the location of the pupil in the direction along the optical axis because strong artifacts otherwise arise in the images combined by calculation.

In the case of a light sheet arrangement, the aforementioned method of the half pupil contrast is not possible in the manner known from the prior art. There always is a strongly asymmetrical intensity distribution between the partial images in the case of a half coverage (halving) of the pupil, both in the illumination beam path and the detection beam path.

However, this asymmetric intensity distribution may be avoided if the half coverage of the illumination pupil is carried out precisely in the plane spanned by the optical axes of the detection objective and the illumination objective.

In embodiments of the microscope with oblique illumination, the illumination pupil may be covered in the illumination beam path as well as in the detection beam path.

If a collinear illumination has been realized, the illumination pupil may likewise be covered in the illumination beam path as well as in the detection beam path. Here, the orientation of the division plays no role as a matter of principle.

By way of example, the mask may have a movable embodiment and be arranged in a pupil of the detection objective. Exactly half of the pupil is covered or coverable by means of the movable mask.

The object is further achieved by method for operating a light sheet microscope. The method comprises the steps of illuminating a specimen situated in a specimen plane with light from an overview illumination apparatus along a reference axis directed substantially orthogonal to the specimen plane and of detecting the light from the overview illumination apparatus as transmitted light by means of a detection objective having a detection axis referred to as second optical axis, wherein the second optical axis of the detection objective includes an angle which differs from zero with the reference axis. Furthermore, the method comprises a step in which an overview image of the specimen or of at least regions of the specimen is created depending on the light from the overview illumination apparatus, captured by means of the detection objective. Further, preferably alternating with the step described above, light of a light sheet produced in a reference plane (specimen plane) is captured by means of the detection objective for the purposes of capturing the light of the overview illumination apparatus. Here, it is sufficient for the light sheet to intersect the specimen plane in order to count as being produced in the specimen plane.

In a further configuration of the method, the overview image is created by means of a TIE (transport of intensity equation). Here, it is advantageous that the Z-stack required for TIE is present in any case and no additional method steps need to be carried out.

The image is recorded while the specimen and the focus of the detection object are moved relative to one another in the specimen plane, for example in the direction of the X-axis. Here, an image of the specimen is recorded and optionally stored at each recording position. The recorded images are combined to form an image stack, which is usually referred to as Z-stack as it is produced by displacing the objective or the specimen along the Z-axis within the scope of conventional microscopy. In the present case, the image plane of the detection objective, in which the field-of-view extends and in which the focus lies, is inclined in relation to the specimen plane and extends along the first optical axis. In this respect, also see the Figures FIGS. 7*a* and 7*b* as well as FIGS. 8*a* to 8*c* and the associated description.

In further configurations, the method may be carried out by virtue of a Z-stack of planes, or of individual images of the planes, being captured, with the planes being transformed into a Z-stack if they are inclined in relation to the third optical axis and the specimen plane, the planes of said Z-stack not being inclined in relation to the third optical axis and the specimen plane, by virtue of the captured Z-stack, the individual planes of which are displaced in relation to one another (skew), being virtually surrounded by a lattice having X-, Y- and Z-axes which extend orthogonal to one another, wherein the X-axis and the Y-axis are directed parallel to the specimen plane and the Z-axis is directed perpendicular to the specimen plane, the spacings of the planes of the normalized Z-stack being selected in the direction of the Z-axis in such a way that the spacings correspond to one of the lateral resolutions of the captured Z-stack, such that the following applies:

$\Delta x' = \Delta x,$ $\Delta y' = \Delta y$ and $\Delta z' = \Delta x$ or $\Delta y.$ Subsequently, new lattice points $P_{x,y,z}$ of a non-displaced, normalized Z-stack (deskew) are calculated and an intensity at the respective new lattice points $P_{x,y,z}$ is calculated by means of three weighted interpolations of adjacent lattice points $P_{x',y',z'}$ of the captured Z-stack.

The specifications X, Y and Z relate to the directions of the axes of a Cartesian coordinate system.

The specifications x', y' and z' represent the respective coordinates of a lattice point. The specifications x, y and z denote the coordinates of a lattice point $P_{x',y',z'}$ in a non-displaced (deskew, deskewed) lattice.

The specifications $\Delta x$, $\Delta y$, $\Delta z$ and $\Delta x'$, $\Delta y'$ and $\Delta z'$ represent the respective differences between the coordinates in the direction of one of the axes X, Y or Z. The specification $\Delta z'$ or $\Delta z$ also specifies a spacing between adjacent XY-planes of the Z-stack in the direction of the Z-axis and is referred to as increment.

In a modified configuration of the method, a Z-stack of planes is captured, wherein the planes are transformed into XY-planes of a normalized Z-stack by virtue of the captured Z-stack, the individual planes of which are displaced in relation to one another (skew), being virtually surrounded by a lattice having X-, Y- and Z-axes which extend orthogonal to one another, wherein the X-axis and the Y-axis are directed parallel to the specimen plane and the Z-axis is directed perpendicular to the specimen plane, the spacings of the XY-planes of the normalized Z-stack being selected in the direction of the Z-axis in such a way that the spacings correspond to one of the lateral resolutions of the captured Z-stack (skew), such that the following applies:

$\Delta x' = \Delta x$ $\Delta y' = \Delta y$ $\Delta z' = \Delta y * \sin(\alpha_1),$ where the angle $\alpha_1$ is included by the first optical axis and the third optical axis.

New lattice points $P_{x,y,z}$ of a non-displaced, normalized Z-stack (deskew) are calculated and an intensity at the respective new lattice points $P_{x,y,z}$ is calculated by means of three weighted interpolations of adjacent lattice points $P_{x',y',z'}$ of the captured Z-stack.

The recording speed of capturing a plane is set in further configurations of the method by virtue of an increment $\Delta z'$ between two planes to be captured being set or a Z-stack being captured with a first increment $\Delta z'$, a region of interest (ROI) being selected and the selected region of interest being captured with a second increment $\Delta z'$, wherein the second increment $\Delta z'$ is less than the first increment $\Delta z'$ and hence the resolution of the region of interest captured by means of the second increment $\Delta z'$ is higher than the region of interest captured by means of the first increment $\Delta z'$, or only one XY-plane parallel to the reference plane being calculated and displayed in each case.

It is also possible that a single-line region of interest is selected in the direction of the X-axis or the Y-axis and the single-line region of interest is respectively captured per XY-plane in the direction of the Z-axis.

By way of example, the respective XY-plane is depicted displaced by a value $\Delta = \Delta z / \tan(\alpha_1)$ in relation to a previous XY-plane.

BRIEF DESCRIPTION OF THE DRAWINGS

FIG. 1a shows a schematic illustration of a microscope with a 45° arrangement of the illumination objective and detection objective above a specimen plane and with a wide-field objective below a specimen plane, in accordance with the prior art;

FIG. 1b shows a schematic illustration of a microscope with an inverted 45° arrangement of the illumination objective and detection objective below a specimen plane and with a wide-field objective above a specimen plane, in accordance with the prior art;

FIG. 2a shows a schematic illustration of a first exemplary embodiment of a microscope according to the invention;

FIG. 2b shows a schematic illustration of the numerical apertures of the first exemplary embodiment of the microscope according to the invention;

FIG. 4a shows a schematic illustration of a third exemplary embodiment of a microscope according to the invention, comprising a mask;

FIG. 4b shows a schematic illustration of the numerical apertures of the third exemplary embodiment of the microscope according to the invention;

FIG. 8a shows a schematic illustration of a displaced captured Z-stack (skew) and of a virtual lattice;

FIG. 8b shows a schematic illustration of a first transformation 1 and

FIG. 8c shows a schematic illustration of a second transformation 2.

The same reference signs denote the same elements in the following exemplary embodiments and schematic illustrations.

DETAILED DESCRIPTION OF EMBODIMENTS

Figure 3B:
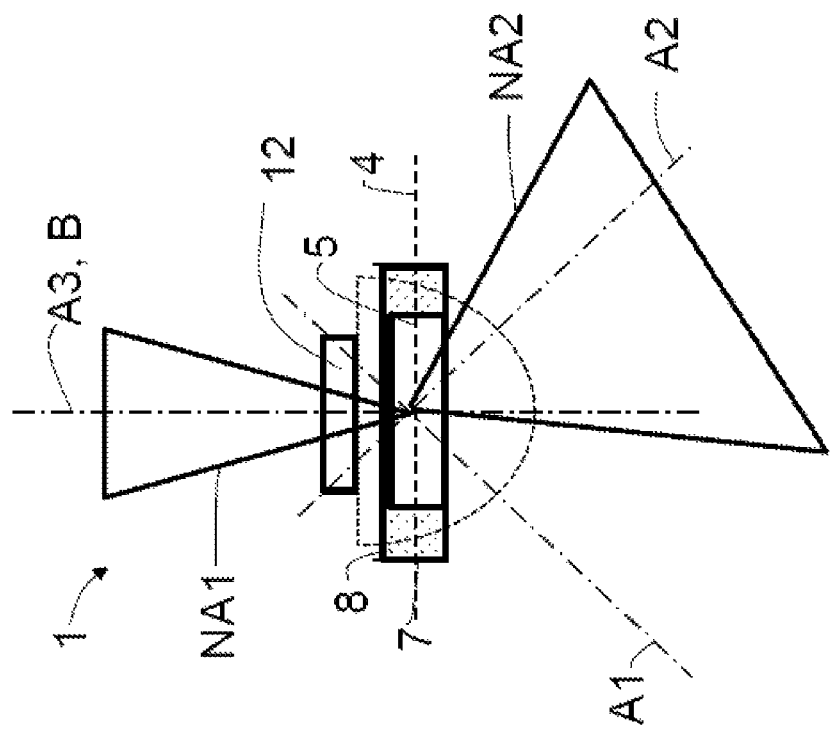
FIG. 3b shows a schematic illustration of the numerical apertures of the second exemplary embodiment of the microscope according to the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An upright microscope 1, as depicted schematically in FIG. 1a, comprising an illumination objective 2, a detection objective 3 and a wide-field objective 20 is known from the prior art. A light sheet 6 is produced or producible along a first optical axis A1 by means of the illumination objective 2, said light sheet being usable to examine a specimen 5 arranged in a specimen plane 4. The detection objective 3 has a second optical axis A2, along which the light coming from the specimen plane 4 may be captured. The first optical axis A1 and the second optical axis A2 are aligned orthogonal to one another and each include an angle of 45° with the specimen plane 4 which serves as a reference plane B.

The wide-field objective 20 has a third optical axis A3, which is directed orthogonally to the specimen plane 4 and serves as a reference axis B. The first to third optical axes A1 to A3 intersect in the region of extent of the light sheet 6 in the specimen 5. Moreover, the first optical axis A1 includes a first angle $\alpha 1$ with the reference axis B and the second optical axis A2 includes a second angle $\alpha 2$ of 90°-$\alpha 1$ with the reference axis B, e.g. respectively 45°.

The specimen 5 is held in a specimen holder 7 which is filled with a liquid 8.

FIG. 1b schematically shows a microscope 1 with an inverted arrangement of illumination objective 2 and detection objective 3, in which the illumination objective 2 and the detection objective 3 are arranged below the specimen plane 4 and the wide-field objective 20 is arranged above the specimen plane 4. Once again, the angles $\alpha 1$ and $\alpha 2$ are 45° in each case.

The following exemplary embodiments are illustrated in an exemplary manner on the basis of inverted microscopes 1 and may, in further embodiments, also be embodied as upright microscopes 1.

In an inverted microscope 1 schematically depicted in FIG. 2a, the illumination objective 2 and the detection objective 3 are arranged at angles $\alpha 1$ and $\alpha 2$ of 45°.

In further embodiments of the microscope 1, the angles $\alpha 1$ and $\alpha 2$ have numbers of degrees deviating from 45°, with the angles substantially complementing one another to 90°.

Instead of a wide-field objective 20 (see FIGS. 1a and 1b), an illumination optical unit 9 of an overview illumination apparatus in the form of a condenser is present, said illumination optical unit being embodied to transmit light into the specimen plane 4 along the third optical axis A3, which coincides with the reference axis B. In further embodiments, the condenser is embodied as an air condenser. In further embodiments, the illumination optical unit 9 is embodied as an optical lens.

In further embodiments, the illumination optical unit 9 is formed by an illumination objective 20. In addition to illumination purposes, the latter may also be embodied for observing and/or imaging the specimen 5.

The illumination optical unit 9 is used to illuminate a region of the specimen 5 which lies in the field of view of the detection objective 3. Since the third optical axis A3 of the illumination optical unit 9 is aligned at an angle unequal to 0° or 180° in relation to the second optical axis A2, an oblique illumination is necessarily present without corresponding masks being introduced into the beam path of the illumination optical unit 9, as is usual in the case of conventional stands.

The oblique illumination facilitates capturing a wide-field image by means of the detection objective 3 as an overview image with an enhanced contrast. The illumination optical unit 9 need not necessarily be immersed into the liquid 8, e.g. water, of the specimen holder 7 (water dipping). Rather, the specimen 5 may be illuminated through the air/liquid interface using an (air) condenser. This is possible as the aberrations in the illumination, occurring in the process, are uncritical for imaging.

In further embodiments of the microscope 1, a polarizer, Hoffmann optical units and/or DIC prisms are optionally respectively arranged in suitable combinations in the beam path of the illumination optical unit 9 and in a beam path of the detection objective 3; this is shown schematically by the frame denoted by the reference sign 10.

FIG. 2b depicts the aperture cones, i.e. the numerical apertures NA1 or of the illumination optical unit 9 and NA2 of the detection objective 3, and a region in which the numerical apertures NA1, NA2 overlap (overlap region). The first optical axis A1 and the second optical axis A2 do not extend parallel to one another.

The numerical aperture NA1 of the illumination optical unit 9 is depicted schematically both as an object-side aperture angle and as an image-side aperture angle along the third optical axis A3.

This form of representing numerical apertures is also used in the following exemplary embodiments.

Figure 3A:
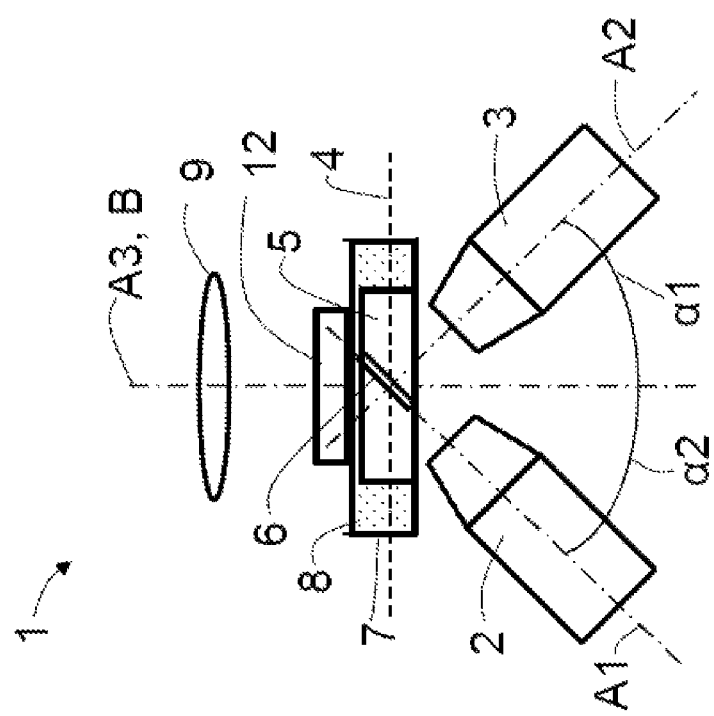
FIG. 3a shows a schematic illustration of a second exemplary embodiment of a microscope according to the invention, comprising a diffusor.

A diffuser 12 in the form of a diffusing screen is arranged in the beam path of the illumination optical unit 9 between the latter and the specimen 5 (FIG. 3a). The light of the illumination optical unit 9 scattered by the diffuser 12 is elucidated by half an oval edged by dashed lines (FIG. 3b).

Only a portion of the illumination light from the region of the overlap is detectable by means of the detection objective 3, depending on the numerical apertures NA1, NA2 and the mutual overlap thereof. It is possible to set the degree of overlap by adapting the numerical aperture NA1 of the illumination objective 20 or of the illumination optical unit 9. In order to achieve a resolution which is as high as possible, it is necessary to work with high numerical apertures NA1 and NA2, both on the illumination side and on the detection side. However, the strong overlap of NA1 and NA2 may be disadvantageous in the case of specimens with a low structure density, for example those with singulated, small objects, since it is necessary to detect small variations in front of a very bright background.

This impairment is avoided by virtue of a mask 11 being arranged in the pupil of the overview illumination apparatus or of the illumination optical unit 9, said mask precisely blocking the overlap region of NA1 and NA2, as depicted schematically in FIG. 4a.

In FIG. 4b, the region of the numerical aperture NA1 masked by means of the mask 11 is denoted by NA1mask and the unmasked region is denoted by NA1unmask.

Therefore, the mask may block the overlap region as plotted; in that case, a dark field is realized, in which only light scattered in the specimen 5 is detected by the detection objective 3. Alternatively, the non-overlapping region may be blocked by means of the mask 11, as a result of which an ideal oblique illumination is then obtained.

Figure 5B:
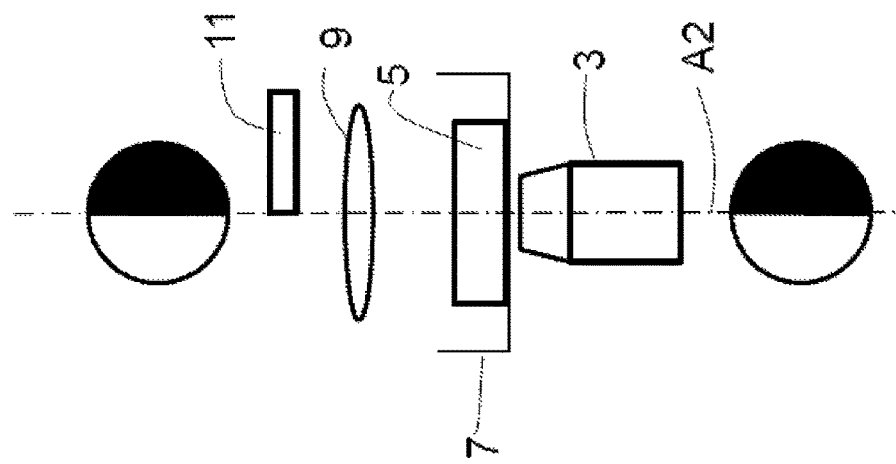
FIG. 5b shows a schematic illustration of the fourth exemplary embodiment of the microscope according to the invention, in a side view and with schematically illustrated pupil coverages.
Figure 5A:
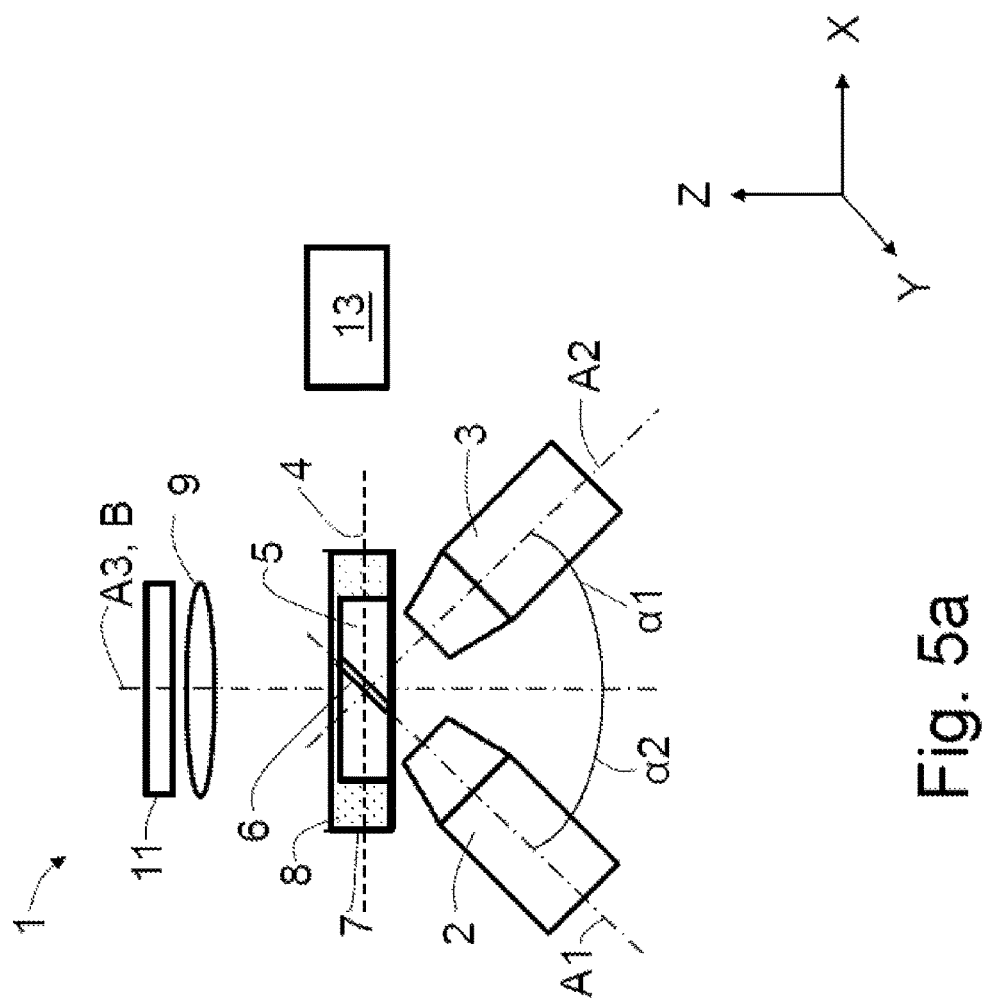
FIG. 5a shows a schematic illustration of a fourth exemplary embodiment of the microscope according to the invention, comprising a half-sided mask.

In a fourth exemplary embodiment of the microscope 1 depicted schematically in FIG. 5a, a mask 11 is arranged in the beam path of the overview illumination apparatus in said figure, said mask bringing about a half-sided coverage of the overview illumination pupil and being able to produce a half-pupil contrast, as is described further above.

FIG. 5b depicts the coverage in the beam path of the overview illumination apparatus and of the illumination optical unit 9, and also the resulting masking in the beam path of the detection objective 3.

Each of the exemplary embodiments described above may comprise a control unit 13 (only depicted in FIG. 5a) which may be embodied to actuate an illumination source (not depicted in any more detail), the illumination objective 2, the detection objective 3 and/or the illumination optical unit 9. Further, the control unit 13 may be embodied to evaluate the captured overview images and/or the images of the light sheet 6. The control unit 13 may be connected to a display for graphically illustrating the captured overview images and/or the images of the light sheet 6.

Figure 6:
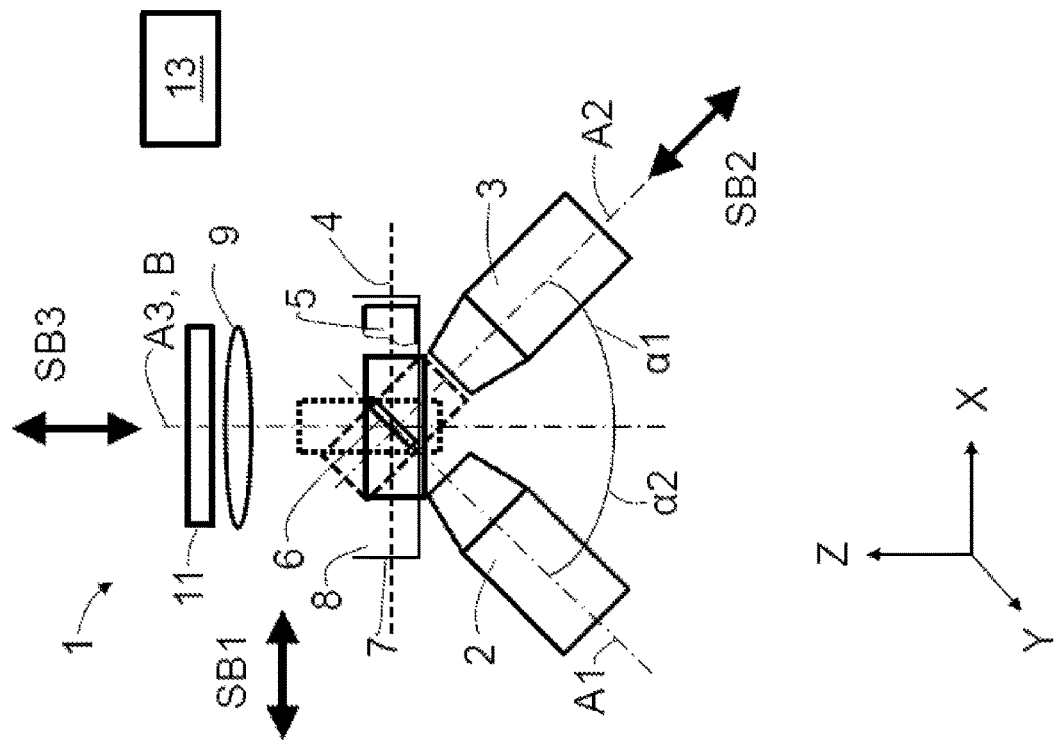
FIG. 6 shows a schematic illustration of a (fifth) exemplary embodiment of the microscope according to the invention, with symbolized capture regions.

Different options of image acquisition are realizable, as a matter of principle, by means of one of the embodiments of the microscope 1 according to the invention. Some of the options are elucidated using the example of FIG. 6.

The simplified illustration of the light sheet 6 simultaneously specifies an object plane of the detection objective 3. A specimen scan may be carried out in the direction of the specimen plane 4 by way of a first scanning movement SB1. In so doing, the specimen volume edged by a solid line in an exemplary manner and shown as a rectangle for a simplified illustration is scanned.

In a further option, a relative motion is brought about as a second scanning movement SB2 between the specimen 5 and the light sheet 6 or the object plane in the direction of the second optical axis A2. In so doing, e.g. the specimen volume shown edged by means of an interrupted solid line is scanned.

A third option consists of producing a relative movement as third scanning movement SB3 in the direction of the third optical axis A3, within the scope of which a specimen volume shown edged by means of a dotted line is scanned.

Further, combinations of the scanning movements SB1, SB2 and/or SB3 are also possible.

The scanned specimen volumes may subsequently be transformed into Z-stacks by means of the transformation explained below.

Combinations of the exemplary embodiments within the scope of considerations by a person skilled in the art are possible.

The method according to the invention may be carried out by any one of the aforementioned embodiments of the microscope 1.

Configurations of the method are described below on the basis of the figures, in particular FIGS. 7a, 7b and 8a, 8b and 8c.

Figure 7B:
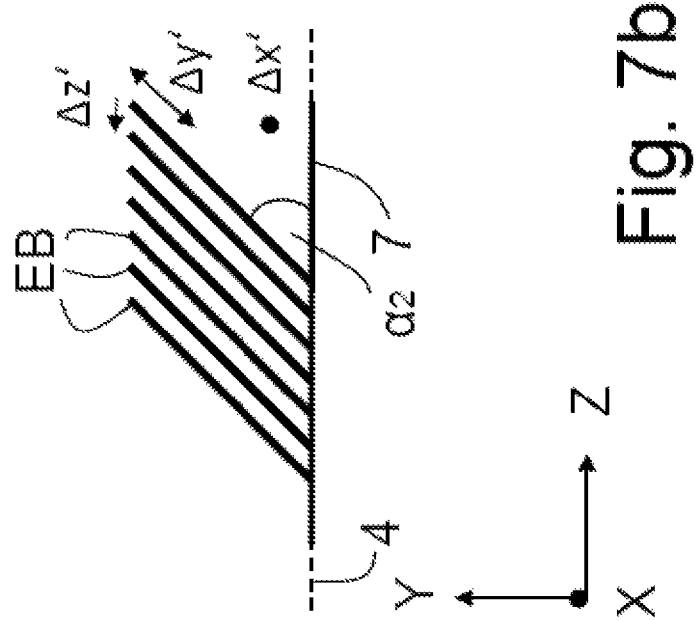
FIG. 7b shows a schematic illustration of the Z-stack in a lateral view of the specimen.
Figure 7A:
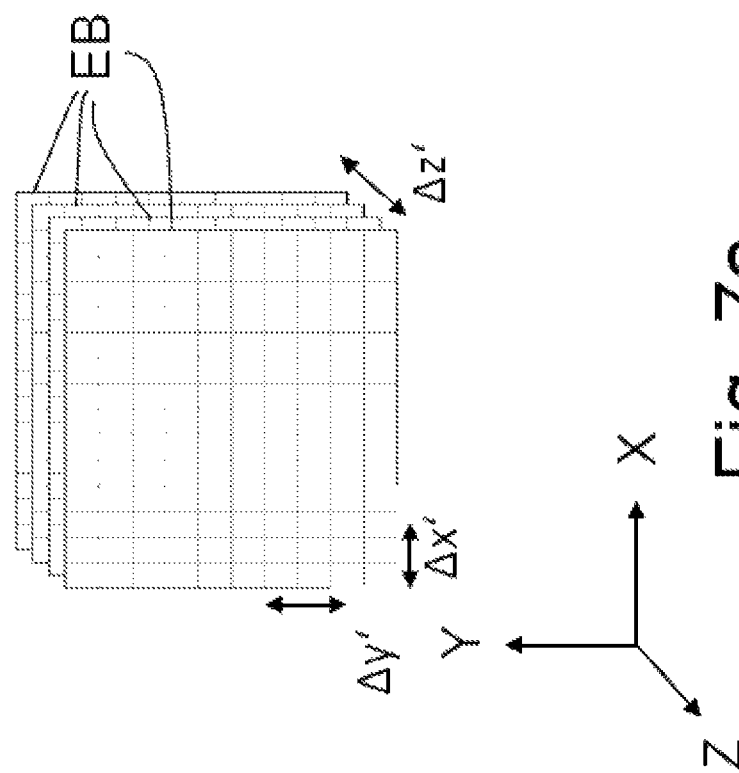
FIG. 7a shows a schematic illustration of a Z-stack from a view along an optical axis of a detection objective of a microscope according to the invention.

FIG. 7a shows a Z-stack in a schematic and, for reasons of presentability, slightly perspective manner, as could be realized in a coordinate system of the detection objective 3 or of a detector (not depicted here). The spacings between captured individual images EB in the direction of the Z-axis Z are denoted by Δz' (see below).

FIG. 7b shows a Z-stack in a coordinate system of the specimen 5, in a lateral view which has been rotated in relation to FIG. 7a.

FIG. 8a depicts a virtual lattice in an exemplary and schematic manner, the X-axis X and Y-axis Y of said lattice lying parallel to the specimen plane 4 and the Z-axis Z being aligned perpendicular to the specimen plane 4. Captured individual images EB, which form a displaced Z-stack, are depicted schematically.

FIG. 8b schematically illustrates a transformation 1 described in more detail below and FIG. 8c illustrates a transformation 2.

An individual image EB (FIGS. 7a and 7b) is initially obtained in the method, said individual image having been recorded using one of the above-described embodiments of the microscope 1. The individual image EB is aligned perpendicular to the second optical axis A2 of the detection objective 3 (FIG. 7a) and at an angle of $\alpha_2$ in relation to the specimen plane 4 (FIG. 7b). A number of individual images EB are captured at recording positions, with the recording positions each being spaced apart from one another by a predetermined or selectable increment (denoted by Δz'). By moving (scanning) the specimen 5 in the X-direction X and recording an individual image EB at each recording position, it is possible to create a Z-stack (3D-volume stack) which, in the present case, is a displaced Z-stack since the individual images EB are aligned at an angle of $\alpha_2$ in relation to the specimen plane 4 (FIG. 7b).

A Z-stack is a sequence of individual images EB which lie in succession in the direction of the Z-axis Z. This may readily be carried out for specimens 5 without a preferred direction.

A specimen 5 has a preferred direction if the specimen 5 does not have any arbitrary position and/or extent in space, for example on account of external and/or actual circumstances. A cell may be mentioned in an exemplary manner, said cell lying or growing on a substrate, for example a cover slip. On account of the substrate, the shape of the cell along the contact area thereof with the substrate is predetermined and it has a substantially flat embodiment. Therefore, the cell has a preferred direction pointing away from the substrate.

Particularly in the case of specimens 5 with a preferred direction, which e.g. grow on a cover slip as a substrate, it is helpful for a user if said user is provided with a normalized, non-displaced Z-stack, as is conventional in e.g. laser scanning microscopy (LSM) or when using a rotatable pinhole aperture (spinning disk). The individual planes of a corresponding Z-stack are aligned parallel to the specimen plane 4 (XY-planes). Hence, the captured Z-stack must be converted by way of a suitable transformation ("deskew") into a normalized, non-displaced Z-stack, the XY-planes of which are aligned parallel to the specimen plane 4. By way of example, this may be achieved by one of the two following transformations:

Transformation 1 (xyz-Interpolation)

The originally captured Z-stack is surrounded by a lattice (FIG. 8a), the X-axis X and Y-axis Y of said lattice lying parallel to the specimen plane 4 and the Z-axis Z being aligned perpendicular to the specimen plane 4. The spacings Δz' of the individual planes may be selected in such a way that they correspond to the lateral resolution of the original Z-stack in order to obtain an isotropic voxel dimension:

$$\Delta x' = \Delta x$$

$$\Delta y' = \Delta y$$

$$\Delta z' = \Delta x \text{ or } \Delta y$$

The calculation of the intensities at the new lattice points $P_{x,y,z}$ is carried out by three weighted interpolations of adjacent lattice points $P_{x',y',z'}$ of the original lattice. The paths subjected to the interpolations are denoted by IP1, IP2 and IP3.

Transformation 2 (y-Interpolation)

The originally captured Z-stack is virtually surrounded by a lattice (FIG. 8a), the X-axis X and Y-axis Y of said lattice lying parallel to the specimen plane 4 and the Z-axis Z being aligned perpendicular to the specimen plane 4. The spacings $\Delta z'$ of the individual lattice planes may be selected in such a way that $$\Delta x' = \Delta x$$

$$\Delta y' = \Delta y$$

$$\Delta z' = \Delta y \cdot \sin(\alpha_1)$$

applies. The calculation of the intensities at the new lattice points $P_{x,y,z}$ is carried out by a weighted interpolation of adjacent points $P_{x',y',z'}$ of the original lattice (FIG. 8c).

After one of the two transformations 1 or 2 has been carried out, the transformed and, as a consequence thereof, normalized Z-stack with XY-planes lying parallel to the specimen plane 4 is available.

The recording speed achievable by means of the method may be increased further by way of one of the four following options A to D, or by way of a combination thereof.

A. A disadvantage of producing an overview image parallel to the specimen plane 4 is that it is always necessary to record a complete Z-stack. As a consequence, the production of an overview image may require a relatively long period of time. The waiting period may be reduced by virtue of increasing the increment $\Delta z$ between two XY-planes and hence having to record few images.

B. Alternatively, a relatively long waiting period may also be accepted in order to record a large volume of the specimen 5 at a low resolution (e.g. including tiling). Subsequently, the entire volume is observed virtually with the aid of a 3D-viewer and a region of interest (ROI) is identified. Following this, an overview image of this region of interest may be recorded with an increased resolution, for example with smaller increments $\Delta z$ between the XY-planes.

C. A further acceleration of the method may be obtained if only one XY-plane is calculated parallel to the specimen plane 4 and displayed immediately, instead of calculating the entire Z-stack at once. All interpolation may be dispensed with.

D. Alternatively, a single line may also be read directly by selecting a single-line ROI on a detector, e.g. a camera. Instead of recording many large individual images EB in the Z-direction Z, many lines are now recorded in the Z-direction Z. This may be carried out much more quickly than recording a complete individual image EB.

In methods C and D, it is possible to select which line—and hence which XY-plane parallel to the specimen plane 4—is displayed. When displaying, it must be observed that each individual XY-plane must be displaced by $$\Delta = \frac{\Delta z}{\tan(\alpha_1)}$$

in relation to the previous XY-plane.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE SIGNS

1 Microscope
2 Illumination objective
20 Wide-field objective
3 Detection objective
4 Specimen plane
5 Specimen
6 Light sheet
7 Specimen holder
8 Liquid
9 Illumination optical unit
B Reference axis
10 Polarizer, Hoffmann optical unit, DIC prism
11 Mask
12 Diffuser
13 Control unit
EB Individual image
NA1 Numerical aperture (of the illumination optical unit 9)
NA2 Numerical aperture (of the detection objective 3)
NA1mask Masked region (of NA1)
NA1unmask Unmasked region (of NA1)
A1 First optical axis
A2 Second optical axis
A3 Third optical axis
IP1 First interpolation
IP2 Second interpolation
IP3 Third interpolation
$\alpha 1$ Angle (between first optical axis A1 and third optical axis A3)
$\alpha 2$ Angle (between second optical axis A2 and third optical axis A3)

The invention claimed is:

1. A microscope comprising:
    an illumination objective, with a first optical axis, configured to produce a light sheet at least in part in a specimen plane;
    a detection objective, with a second optical axis, configured to detect light coming from the specimen plane; and
    an illumination optical unit for wide-field illumination of the specimen plane, the illumination optical unit comprising an illumination optical unit with a third optical axis;
    wherein the illumination objective and the detection objective are aligned relative to one another and relative to the specimen plane in such a way that the first optical axis and the second optical axis intersect in the specimen plane and form a substantially right angle therebetween;
    wherein the first optical axis and the second optical axis each form an angle which differs from zero with a reference axis orthogonal to the specimen plane; and
    wherein the detection objective is configured to detect both light from the light sheet, and light from the illumination optical unit, and the third optical axis of the illumination optical unit is directed substantially along the reference axis and is aligned at an angle which differs from zero in relation to the second optical axis of the detection objective.

2. The microscope according to claim 1, further comprising
    a mask that is arranged in a pupil of the illumination optical unit.

3. The microscope according to claim 1, further comprising:
a polarizer that is arranged in a beam path of the illumination optical unit and in a beam path of the detection objective.

4. The microscope according to claim 1, further comprising:
Hoffmann optical units that are arranged in a beam path of the illumination optical unit and in a beam path of the detection objective.

5. The microscope according to claim 1, further comprising:
DIC prisms that are arranged in a beam path of the illumination optical unit and in a beam path of the detection objective.

6. The microscope according to claim 1, further comprising:
a diffusor that is arranged between the detection objective and the illumination optical unit.

7. The microscope according to claim 6;
wherein the diffuser comprises an LED, or an OLED with a ground glass screen disposed downstream thereof.

8. The microscope according to claim 1, further comprising:
a mask arranged in a beam path of the illumination optical unit, said mask configured to darken an overlap region so as to produce dark-field illumination in the specimen plane.

9. The microscope according to claim 1, further comprising:
a movable mask arranged in a pupil of the illumination optical unit, exactly one half of the pupil being covered by said mask.

10. A method for operating a light sheet microscope, comprising the following steps:
illuminating a specimen situated in a specimen plane along an optical axis of an overview illumination apparatus with light from said overview illumination apparatus along a reference axis directed substantially orthogonal to the specimen plane;
detecting the light from the overview illumination apparatus as transmitted light by means of a detection objective having an optical axis, wherein the optical axis of the detection objective includes an angle that differs from zero with the reference axis;
creating an overview image of the specimen depending on the light from the overview illumination apparatus, captured by means of the detection objective; and
capturing light of a light sheet produced along an optical axis of an illumination objective in the specimen plane by means of the detection objective to capture the light of the overview illumination apparatus.

11. The method according to claim 10,
wherein the overview image is created by means of a TIE (transport of intensity equation).

12. The method according to claim 10, further comprising:
capturing a Z-stack of XY-planes, wherein the captured XY-planes are transformed into normalized XY-planes of a normalized Z-stack if the captured XY-planes have a preferred direction, the normalized XY-planes of said normalized Z-stack not having a preferred direction, by virtue of:
the captured Z-stack being virtually surrounded by a lattice having X-, Y- and Z-axes that extend orthogonal to one another, wherein the X-axis and the Y-axis are directed parallel to the specimen plane and the Z-axis is directed perpendicular to the specimen plane;
wherein spacings of the XY-planes of the normalized Z-stack are selected in a direction of the Z-axis in such a way that the spacings correspond to a lateral resolution of the captured Z-stack, such that the following applies:

$\Delta x' = \Delta x;$ $\Delta y' = \Delta y;$ and $\Delta z' = \Delta x$ or $\Delta y;$ calculating new lattice points ($P_{x,y,z}$); and
calculating an intensity at the new lattice points ($P_{x,y,z}$) by means of three weighted interpolations of adjacent (lattice) points ($P_{x',y',z'}$) of the captured Z-stack.

13. The method according to claim 10, further comprising:
capturing a Z-stack of XY-planes, wherein the captured XY-planes are transformed into normalized XY-planes of a normalized Z-stack if they have a preferred direction, the normalized XY-planes of said normalized Z-stack not having a preferred direction, by virtue of:
the captured Z-stack being virtually surrounded by a lattice having X-, Y- and Z-axes that extend orthogonal to one another, wherein the X-axis and the Y-axis are directed parallel to the specimen plane and the Z-axis is directed perpendicular to the specimen plane;
wherein spacings of the XY-planes of the normalized Z-stack are selected in a direction of the Z-axis (Z) in such a way that the spacings correspond to a lateral resolution of the captured Z-stack, such that the following applies:

$\Delta x' = \Delta x;$ $\Delta y' = \Delta y;$ and $\Delta z' = \Delta y * \sin(\alpha_1);$ where the angle $\alpha_1$ is the angle between the first optical axis and the third optical axis;
calculating new lattice points ($P_{x,y,z}$); and
calculating an intensity at the new lattice points ($P_{x,y,z}$) by means of three weighted interpolations of adjacent (lattice) points ($P_{x',y',z'}$) of the captured Z-stack.

14. The method according to claim 10;
wherein a recording speed of a capture of an XY-plane is set by virtue of:
(a) an increment $\Delta z'$ between two XY-planes to be captured being set; or
(b) a Z-stack being captured with a first increment ($\Delta z'$), a region of interest being selected and the selected region of interest being captured with a second increment ($\Delta z'$), wherein the second increment ($\Delta z'$) is greater than the first increment ($\Delta z'$); or
(c) only one XY-plane parallel to the specimen plane being calculated and displayed on a display in each case.

15. The method according to claim 10, further comprising:
selecting a single-line region of interest in a direction of the X-axis or the Y-axis and respectively capturing the single-line region of interest per XY-plane in the direction of the Z-axis.

16. The method according to claim 14, wherein when the recording speed of the capture of the XY-plane is set by virtue of only one XY-plane parallel to the specimen plane;
a respective XY-plane, when displayed on the display, is depicted displaced by a value $\Delta=\Delta z'/\tan(\alpha_1)$ in relation to a previously captured XY-plane.

17. The method according to claim 15;
wherein the respective XY-plane, when displayed on the display, is depicted displaced by a value $\Delta=\Delta z'/\tan(\alpha_1)$ in relation to a previous captured XY-plane.

* * * * *